(12) United States Patent
Mui et al.

(10) Patent No.: US 8,615,804 B2
(45) Date of Patent: Dec. 24, 2013

(54) COMPLEMENTARY CHARACTER ENCODING FOR PREVENTING INPUT INJECTION IN WEB APPLICATIONS

(75) Inventors: Raymond Mui, New York, NY (US); Phyllis Frankl, Brooklyn, NY (US)

(73) Assignee: Polytechnic Institute of New York University, Brooklyn, NY (US)

( * ) Notice: Subject to any disclaimer, the term of this patent is extended or adjusted under 35 U.S.C. 154(b) by 412 days.

(21) Appl. No.: 13/030,657

(22) Filed: Feb. 18, 2011

(65) Prior Publication Data

US 2011/0252475 A1 Oct. 13, 2011

Related U.S. Application Data

(60) Provisional application No. 61/305,765, filed on Feb. 18, 2010.

(51) Int. Cl.
G06F 21/00 (2013.01)
(52) U.S. Cl.
USPC ............................................. 726/23; 717/154
(58) Field of Classification Search
USPC .......................................................... 726/23
See application file for complete search history.

(56) References Cited

U.S. PATENT DOCUMENTS 7,779,399 B2 * 8/2010 Huang et al. ................... 717/154
2010/0083379 A1 * 4/2010 Katsunuma et al. ............ 726/23

OTHER PUBLICATIONS

James Newsome and Dawn Song, Dynamic Taint Analysis for Automatic Detection, Analysis, and Signature Generation of Exploits on Commodity Software, 2004, pp. 1-17.*

William G.J. Halfond et al., Using Positive Tainting and Syntax-Aware Evaluation to Counter SQL Injection Attacks, Nov. 2006, pp. 1-11.*
Joanna, How you can prevent an SQL injection, 2010, pp. 1-4.*
Euson et al., How to: Protect From SQL injection in ASP.NET, 2005, pp. 1-14.*
Vivek Haider, Deepak Chandra, and Michael Franz. Dynamic taint propagation for java. In ACSAC '05: Proceedings of the 21st Annual Computer Security Applications Conference, pp. 303-311, Washington, DC, USA, 2005. IEEE Computer Society.

(Continued)

*Primary Examiner* — Andrew Goldberg
(74) *Attorney, Agent, or Firm* — Laurence P. Colton; Smith Risley Tempel Santos LLC (57) ABSTRACT

Method to prevent the effect of web application injection attacks, such as SQL injection and cross-site scripting (XSS), which are major threats to the security of the Internet. Method using complementary character coding, a new approach to character level dynamic tainting, which allows efficient and precise taint propagation across the boundaries of server components, and also between servers and clients over HTTP. In this approach, each character has two encodings, which can be used to distinguish trusted and untrusted data. Small modifications to the lexical analyzers in components such as the application code interpreter, the database management system, and (optionally) the web browser allow them to become complement aware components, capable of using this alternative character coding scheme to enforce security policies aimed at preventing injection attacks, while continuing to function normally in other respects. This approach overcomes some weaknesses of previous dynamic tainting approaches by offering a precise protection against persistent cross-site scripting attacks, as taint information is maintained when data is passed to a database and later retrieved by the application program. The technique is effective on a group of vulnerable benchmarks and has low overhead.

21 Claims, 4 Drawing Sheets

(56) References Cited

OTHER PUBLICATIONS

William G. J. Halfond, Alessandro Orso, and Panagiotis Manolios. Using positive tainting and syntax-aware evaluation to counter sql injection attacks. In SIGSOFT '06/FSE-14: Proceedings of the 14th ACM SIGSOFT International Symposium on Foundations of Software Engineering, pp. 175-185, New York, NY, USA, 2006. ACM.

Philipp Vogt, Florian Nentwich, Nenad Jovanovic, Engin Kirda, Christopher Kruegel, and Giovanni Vigna. Cross-site scripting prevention with dynamic data tainting and static analysis. In in Proceeding of the Network and Distributed System Security Symposium NDSS07, 2007.

Anh Nguyen-Tuong, Salvatore Guarnieri, Doug Greene, Jeff Shirley, and David Evans. Automatically hardening web applications using precise tainting. In Ryoichi Sasaki, Sihan Qing, Eiji Okamoto, and Hiroshi Yoshiura, editors, SEC, pp. 295-308. Springer, 2005.

Perl security: Taint mode. http://perldoc.perl.org/perlsec.html#Taint-mode. (Accessed Jul. 18, 2013).

Tadeusz Pietraszek, Chris Vanden Berghe, Chris V, and En Berghe. Defending against injection attacks through context-sensitive string evaluation. In in Recent Advances in Intrusion Detection (RAID), 2005.

Wei Xu, Sandeep Bhatkar, and R. Sekar. Taint-enhanced policy enforcement: a practical approach to defeat a wide range of attacks. In USENI-SS'06: Proceedings of the 15th Conference on USENIX Security Symposium, Berkeley, CA, USA, 2006. USENIX Association.

\* cited by examiner

```
1.   <?PHP
2.
3.   //connect to database
4.   connectdb( );
5.
6.   //unsanitized user inputs
7.   $message = $_POST['message'];
8.   $username = $_POST['username'];
9.
10.  //html header
11.  echo '<html>
12.    <head> <title>Blog</title> </head>
13.    <body>';
14.
15.  //welcome the user
16.  if(isset($username)) {
17.     echo "Welcome $username <br />";
18.  }
19.
20.  //insert new message
21.  if(isset($message)) {
22.     $query = "insert into messages values ('$username', '$message')";
23.     $result = MySQL_query($query);
24.  }
25.
26.  //display all messages besides the ones from admin
27.  $query = "select * from messages";
```

Figure 1A: Example Code of an Example Web Application

```
28.   $result = MySQL_query($query);
29.   echo '<br /><b>Your messages:</b>';
30.   while($row=MySQL_fetch_assoc($result)){
31.      if($row['username'] != "admin") {
32.         echo "<br />{$row['username']} wrote: <br />{$row['message']}<br />";
33.      }
34.   }
35.
36.   //display the rest of html
37.   echo '<br /><br /><b>Post new message</b>';
38.   echo "<form action=\"blog.PHP\" method=\"post\">";
39.   echo ' <br /> name <br />
40.      <input type="text" name = "username"> <br />
41.      <br /> message <br />
42.      <textarea wrap="virtual" cols="50%" rows="5%" name="message">
43.      </textarea><br /><br />
44.      <input type="submit" value="submit">
45.      </form>
46.      </body> </html>';
47.   ?>
```

Figure 1B: Example Code of an Example Web Application

Case1: username = user
       message = hello
Case2: username = user
       message = hello');drop table messages;--
Case3: username = <script>document.location="http://poly.edu"</script>
       message = hello
Case4: username = user
       message = <script>document.location="http://poly.edu"</script>

Figure 2: Input Cases for Example in Figure 1

Figure 3: An architecture of the present invention

COMPLEMENTARY CHARACTER ENCODING FOR PREVENTING INPUT INJECTION IN WEB APPLICATIONS

STATEMENT OF RELATED APPLICATIONS

This patent application claims the benefit of U.S. Provisional Patent Application No. 61/305,765 having a filing date of 18 Feb. 2010, which is incorporated herein in its entirety by this reference.

STATEMENT OF GOVERNMENT INTEREST

This invention was partially supported by the U.S. Department of Education GAANN grant P200A090157, U.S. National Science Foundation grant CCF 0541087, and the Center for Advanced Technology in Telecommunications sponsored by NYSTAR. The U.S. Government may have certain rights in this invention.

BACKGROUND OF THE INVENTION

1. Technical Field

The present invention is generally related to the field of techniques to prevent input injection attacks to web applications, and more specifically related to the field of techniques of using dynamic tainting to prevent injection attacks in web applications.

2. Prior Art

Web applications are becoming an essential part of our everyday lives. As web applications become more complex, the number of programming errors and security holes in them increases, putting users at increasing risk. The scale of web applications has reached the point where security flaws resulting from simple input validation errors have became the most critical threat of web application security. Injection vulnerabilities such as cross site scripting and SQL injection rank as top two of the most critical web application security flaws in the OWASP (Open Web Application Security Project) top ten list [25].

Researchers have proposed many other techniques against web injection attacks. Dynamic tainting techniques [9, 11, 23, 24, 26, 27, 38] have the most similarity to our technique. Dynamic tainting are runtime analysis techniques which generally involve the idea of marking of every string within a program with taint variables and propagating them across execution. Attacks are detected when a tainted string is used as a sensitive value. As discussed herein, the difference between our technique compared to traditional dynamic tainting techniques is that complementary character coding provides character level taint propagation across component boundaries of web applications without the need of code instrumentation and its overhead. Another difference is that while previous dynamic tainting techniques implement taint sinks using code instrumentation to detect attacks, our technique delegates enforcement of the security policy to the parser of each component.

Sekar proposed a technique of black-box taint inference to address some of the limitations with dynamic tainting [28], where the input/output relations of components are observed and maintained to prevent attacks. Su and Wassermann provided a formal definition of input injection attacks and developed a technique to prevent them involving comparing parse trees [30]. Bandhakavi, Bisht, Madhusudan, Venkatakrishnan developed CANDID [3], a dynamic approach to detect SQL injection attacks where candidate clones of a SQL query, one with user inputs and one with benign values, are executed and their parse trees are compared. Louw and Venkatakrishnan proposed a technique to prevent cross site scripting [20] where the application sends two copies of output HTML to a web browser for comparison, one with user inputs and one with benign values. Bisht and Venkatakrishnan proposed a technique called XSS-GUARD [4], in which shadow pages and their parse trees are being compared at the server. Buehrer, Weide, and Sivilotti developed a technique involved with comparing parse trees [6] to prevent SQL injection attacks.

Static techniques [2, 10, 13, 16, 19, 31, 34, 35] employ the use of various static code analysis techniques to locate sources of injection vulnerabilities in code. The results are either reported as output or instrumented with monitors for runtime protection. Because of the inherently imprecise nature of static code analysis, these techniques have the limitations of false positives. They also suffer from scaling problems when run with real world applications. Techniques which involve machine learning [12, 33] also inherently have the limitations of false positives and their effectiveness are dependent on their training sets. Martin, Livshits, and Lam developed PQL [21], a program query language that developers can use to find answers about injection flaws in their applications and suggested that static and dynamic techniques can be developed to solve these queries.

Boyd and Keromytis developed a technique called SQLrand [5] to prevent SQL injection attacks based on instruction set randomization. SQL keywords are randomized at the database level so attacks from user input become syntactically incorrect SQL statements. A proxy is set up between the web server and the database to perform randomization of these keywords using a key. Van Gundy and Chen proposed a technique based on instruction set randomization called Noncespaces against cross site scripting [8]. Nadji, Saxena and Song developed a technique against cross site scripting called Document Structure Integrity [22] by incorporating dynamic tainting at the application and instruction set randomization at the web browser. Kirda, Kruegel, Vigna and Jovanovic developed Noxes [18], a client side firewall based approach to detect possibilities of a cross site scripting attack using special rules. Jim, Swamy, and Hicks proposed a cross site scripting prevention technique called browser enforced embedded policies [15] where a web browser receives instructions from the server over what scripts it should or should not run.

Currently, web applications are vulnerable to injection attacks, such as SQL injection and cross site scripting, in which malicious uses enter inputs that are interpreted as executable code by some web component. Such attacks can lead to corruption of databases or theft of sensitive information. These vulnerabilities rank among the top security problems.

Current practice requires application developers to check and sanitize inputs to guard against injection attacks. This is very error prone. Several research efforts have attacked the problem with such techniques as static analysis and dynamic tainting. However these techniques have various limitations as described above.

Thus it can be seen that improved and new methods for preventing the effect of injection attacks on web applications are desirable.

BRIEF SUMMARY OF THE INVENTION

Web applications typically involve interaction of several components, each of which processes a language. For example, an application may generate SQL queries that are sent to a database management system and generate HTML code with embedded Javascript that is sent to a browser, from which the scripts are sent to a Javascript interpreter. Throughout this specification, we will use the term component languages to refer to the languages of various web application technologies such as PHP, SQL, HTML, Javascript, etc. We will also use the term components to denote the software dealing with the parsing and execution of code written in these languages from both server side and client side such as a PHP interpreter, a database management system, a web browser, etc.

Web application injection attacks occur when user inputs are crafted to cause execution of some component language code that is not intended by the application developer. There are different classes of injection attacks depending on which component language is targeted. For example, SQL injection targets the application's SQL statements while cross site scripting targets the application's HTML and Javascript code. These types of vulnerabilities exist because web applications construct statements in these component languages by mixing untrusted user inputs and trusted developer code. Best application development practice demands the inclusion of proper input validation code to remove these vulnerabilities. However, it is hard to do this because proper input validation is context sensitive. That is, the input validation routine required is different depending on the component language for which the user input is used to construct statements. For example, the input validation required for the construction of SQL statements is different from the one required for the construction of HTML, and that is different from the one required for the construction of Javascript statements inside HTML. Because of this and the increasing complexity of web applications, manual applications of input validation are becoming impractical. Just a single mistake could lead to dire consequences.

Researchers have proposed many techniques to guard against injection vulnerabilities. Several approaches use dynamic tainting techniques [9, 11, 23, 24, 26, 27, 38]. They involve instrumenting application code or modifying the application language interpreter to keep track of which memory locations contain values that are affected by user inputs. Such values are considered "tainted", or untrusted. At runtime, locations storing user inputs are marked as tainted, the taint markings are propagated so that variables that are affected (through data flow and/or control flow) by inputs can be identified, and the taint status of variables is checked at "sinks" where sensitive operations are performed. Dynamic tainting techniques are effective at preventing many classes of injection attacks, but there are a number of drawbacks to current approaches to implementing dynamic tainting. Perhaps the most limiting of these arises when applications store and/or retrieve persistent data (e.g. using a database). Current approaches to dynamic tainting do not provide a clean way to preserve the taint status of such data. Viewing the entire database as tainted, when retrieving data, is overly conservative. But viewing it as untainted leaves applications vulnerable to persistent attacks, such as stored XSS attacks.

This specification discloses a new approach to dynamic tainting, in which taint marks are seamlessly carried with the data as it crosses boundaries between components. In particular, data stored in a database carries its taint status with it, allowing it to be treated appropriately when it is subsequently processed by other application code. The approach is based on complementary character coding, in which each character has two encodings, one used to represent untainted data and the other used to represent tainted data. Characters can be compared with full comparison, in which the two representations are treated differently, or value comparison, in which they are treated as equivalent. With fairly small modifications, components (e.g. the application language interpreter, DBMS, and optionally client-side components) can become complement aware components (CACs), which use full comparison for recognizing (most) tokens of their component language, while using value comparison in other contexts. When component language code entered by a user (attempted injection attacks) is processed by the CAC under attack, the component does not recognize the component language tokens, therefore does not execute the attack. Meanwhile, trusted component language code executes normally. Ideally, the approach will be deployed with complement aware components on both the server side and the client side, but we also demonstrate a server side only approach that still protects current web browsers against XSS attacks. This allows for a gradual migration strategy through the use of server side HTTP content negotiation, supporting both current web browsers and complement aware browsers at once.

In addition to offering protection against stored attacks, the CAC approach has several other attractive features. Existing dynamic tainting approaches require the processing at sinks to embody detailed knowledge of the component language with which the application is interacting at the sink (e.g. SQL, HTML) and to parse the strings accordingly. The CAC approach delegates this checking to the components, which need to parse the strings the application is passing to them anyway. This provides increased efficiency and, potentially, increased accuracy. Taint propagation is also very efficient in the CAC approach, because taint propagation via data flow occurs automatically, without the need for application code instrumentation.

The present invention includes:
  The concept of complementary character coding, a character encoding scheme where each character is encoded with two code points instead of one. Two forms of complementary character coding, Complementary ASCII and complementary Unicode, are presented.
  A new approach to dynamic tainting with complementary character coding, which allows preservation of taint information across component boundaries.
  The concept of complement aware components (CAC), which use complementary character coding to prevent a number of web application input injection attacks, including SQL injection and cross site scripting.
  A proof of concept implementation of our technique in LAMP (Linux Apache MySQL PHP) with complementary ASCII. Two variants are demonstrated, one that requires browser modifications and one that only modifies server side components, allowing an incremental deployment strategy for legacy browsers.
  An experimental evaluation of the prototype, demonstrating that the approach is effective against SQL injection, reflected and stored XSS attacks, and has low overhead.

In complementary character coding, each character has two encodings, a standard character representation and a complement character representation. Characters can be compared using full comparison, in which the two representations are treated differently, or value comparison, in which they are treated as equivalent. Web components processing HTML, SQL, Javascript, etc., are modified to use full comparison in some contexts, such as parsing, while using value comparison in others. This prevents the execution of malicious user inputs as code. By shifting the burden of sanitization to the internals of web components, complementary character coding relieves developers of the need to write input sanitization code.

DETAILED DESCRIPTION OF PREFERRED EMBODIMENTS

This specification is structured as follows: Section 1 presents a motivating example. Section 2 introduces complementary character coding with descriptions of complementary ASCII and complementary Unicode, and our approach of dynamic tainting with complementary character coding. Section 3 describes the use of complementary character coding to prevent web application injection. Section 3 also describes a gradual migration strategy of our technique through the use of HTTP content negotiation. Section 4 provides an example walk-through of the technique, showing how it prevents a series of attacks. Section 5 describes our proof of concept implementation of LAMP (Linux Apache MySQL PHP) using the technique with complementary ASCII. Section 6 shows the results of an experimental evaluation, which demonstrates our implementation's effectiveness against attacks and measures its performance overhead. Section 7 discusses other potential applications of complementary character coding.

1. Motivating Example

Figure 1A:
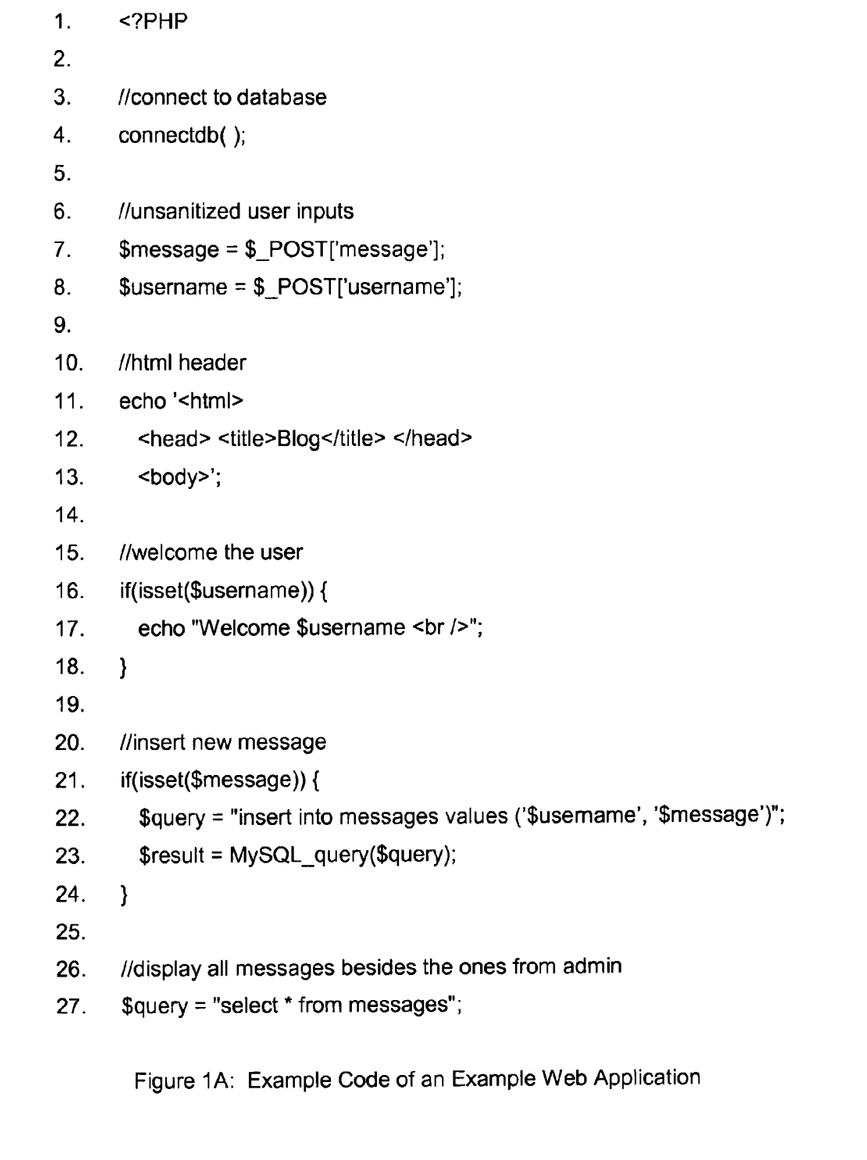
FIG. 1 is example code of an example web application.
Figure 1B:
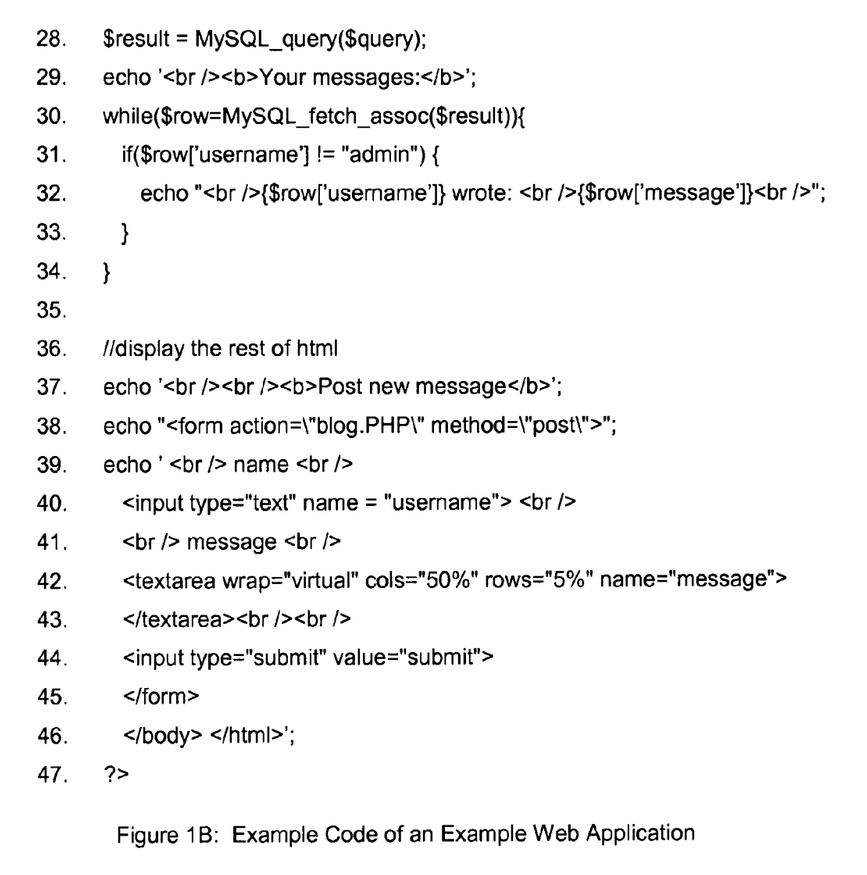
Figure 2:
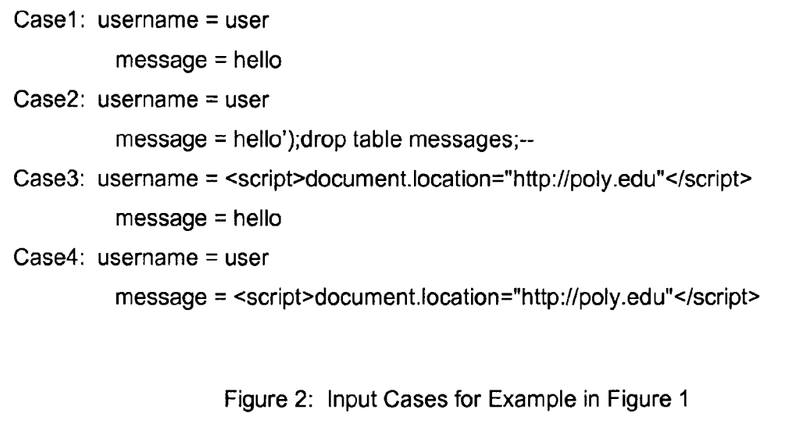
FIG. 2 are input cases for the example shown in FIG. 1.

FIG. 1 contains the code of an example web application. Assume this is a LAMP (Linux Apache MySQL PHP) application. The database contains a single table, called messages with attributes username and message, both stored as strings. We illustrate several cases of execution to demonstrate both normal execution and several types of injection attacks. In Section 4 below, we will show how our technique prevents these attacks. The input cases are shown in FIG. 2.

Case one is an example of a normal execution. Lines 7 and 8 get the user's inputs from the HTTP request for this page. Lines 10 to 13 begin generation of an HTML page that will eventually be sent to the user's browser. A greeting is generated as HTML at lines 16-18. At lines 21 to 24, an SQL insert statement is generated then sent to MySQL, which inserts data provided by the user into the database. Lines 27 to 34 generate an SQL query, send it to MySQL, then iterate through the result set, generating HTML to display the contents of the database (excluding messages from the admin). The web server sends the generated HTML to the user's browser, which parses it and displays the welcome message and the table on the user's screen. We will assume the database is not compromised initially, so no attacks occurred.

Case two is an example of a SQL injection attack. The SQL code being executed at line 23 becomes insert into messages values ('user', 'hello');drop table messages;--'), since there is no input validation. This results in the deletion of the table messages from the database. By modifying the attack string an attacker can construct and execute other malicious SQL code as well.

Case three is an example of a reflected cross site scripting attack. The unsanitized user input (a script) is included in the HTML at line 17. When the HTML is parsed by the browser, it will recognize the script tags and send the enclosed script to its Javascript engine, which will parse it and execute it. In this case the script redirects the user to another website. An attacker can exploit this by inducing users to provide inputs like case three, causing redirection to another malicious web page which steal personal information, etc.

Case four is an example of a persistent cross site scripting attack. At line 23, the unsanitized attack script is stored in the database. It is later displayed to any user visiting the application when lines 27 to 34 are executed. This is a more severe form of cross site scripting because it affects everyone visiting the web page.

2. Complementary Character Coding

In complementary character coding, each character is encoded with two code points instead of one. That is, we have two versions of every character. It is the basis of our technique against web application injection. In this section we introduce complementary ASCII and complementary Unicode, two forms of complementary character coding. We will also introduce the concepts of value comparison and full comparison which are used to compare characters in complementary character coding.

Complementary ASCII is the application of complementary character coding to standard ASCII [1]. In other words, in complementary ASCII we have two versions of every standard ASCII character. This is possible because standard ASCII uses 7 bits per character (with values 0-127), while each byte is 8 bits (with values 0-256). Complementary ASCII is encoded as follows: The lowest seven bits are called the data bits, which associates to standard ASCII characters 0-127. The eighth bit is called the sign bit, a sign bit of 0 corresponds to a standard character and a sign bit of 1 corresponds to a complement character. In other words, for every standard character c in $\{0 \ldots 127\}$) from standard ASCII, there exists a complement character $c'=c+128$ that is its complement.

Table 1 shows the complementary ASCII character table, standard characters are shown with a white background (rows 0 through 7) and complement characters are shown with a dark gray background (rows 8 through F), empty cells represent the ASCII control characters in both versions which are not printable (rows 0 and 1). The rows denote the leftmost 4 bits of a byte in hexadecimal, and the columns denote the rightmost 4 bits. For example, standard character K is 48 (75 in decimal) and its complement version is CB (203 in decimal). Note that the difference between every standard character and its complement version is always 128, which is the result of flipping the sign bit. Because of this, the conversion between standard and complement characters in complementary ASCII can be done in a single instruction. To convert a character into a complement character, a bitwise OR operation with the value of 128 (10000000 in binary) can be used. To convert a character into a standard character, use a bitwise AND operation with the value of 127 (01111111 in binary).

TABLE 1

Complementary ASCII Character Table

| | -0 | -1 | -2 | -3 | -4 | -5 | -6 | -7 | -8 | -9 | -A | -B | -C | -D | -E | -F |
|---|---|---|---|---|---|---|---|---|---|---|---|---|---|---|---|---|
| 0- | | | | | | | | | | | | | | | | |
| 1- | | | | | | | | | | | | | | | | |
| 2- | SP | ! | " | # | $ | % | & | ' | ( | ) | * | + | , | - | . | / |
| 3- | 0 | 1 | 2 | 3 | 4 | 5 | 6 | 7 | 8 | 9 | : | ; | < | = | > | ? |
| 4- | @ | A | B | C | D | E | F | G | H | I | J | K | L | M | N | O |
| 5- | P | Q | R | S | T | U | V | W | X | Y | Z | [ | \ | ] | ^ | _ |
| 6- | ` | a | b | c | d | e | f | g | h | i | j | k | l | m | n | o |
| 7- | p | q | r | s | t | u | v | w | x | y | z | { | \| | } | ~ | |
| 8- | | | | | | | | | | | | | | | | |
| 9- | | | | | | | | | | | | | | | | |
| A- | SP | ! | " | # | $ | % | & | ' | ( | ) | * | + | , | - | . | / |
| B- | 0 | 1 | 2 | 3 | 4 | 5 | 6 | 7 | 8 | 9 | : | ; | < | = | > | ? |
| C- | @ | A | B | C | D | E | F | G | H | I | J | K | L | M | N | O |
| D- | P | Q | R | S | T | U | V | W | X | Y | Z | [ | \ | ] | ^ | _ |
| E- | ` | a | b | c | d | e | f | g | h | i | j | k | l | m | n | o |
| F- | p | q | r | s | t | u | v | w | x | y | z | { | \| | } | ~ | |
| | -0 | -1 | -2 | -3 | -4 | -5 | -6 | -7 | -8 | -9 | -A | -B | -C | -D | -E | -F |

Since there are two versions of every character in complementary character coding, there must be certain rules to establish how characters are being compared. In complementary character coding there are two different ways to compare characters, value comparison and full comparison. Under value comparison, a standard character is equivalent to its complement version. A simple way to implement value comparison is to compute the standard forms of the characters and compare them. In complementary ASCII, it can be done by doing a bitwise AND operation with the value of 127 (01111111 in binary) on both operands and then comparing all the bits.

Full comparison, however, compares all bits of a character including the sign bit. Therefore under full comparison the standard and complement versions of the same character are not equal. Note that all complement characters will be evaluated as greater than all standard characters under full comparison regardless of the value of their data bits. This behavior is not a problem because our technique only uses full comparison for any inequality comparisons.

With the internationalization of the web, standard ASCII characters will no longer be sufficient as Unicode [32] is becoming the standard character format for displaying web content. Currently Unicode contains over a million code points and as of the current version of Unicode 5.2.0 less than 25 percent of this space is used or reserved. Due to the vast amount of available space, complementary Unicode can be implemented in different ways. One possible implementation of complementary Unicode can be done just like complementary ASCII through the use of the high order bit as the sign bit. Under this representation the operations of character conversion, value comparison and full comparison are implemented in nearly the same way as their counterparts in complementary ASCII. Our proof of concept implementation is done in complementary ASCII; future work includes implementation of complementary Unicode. The extra space also allows the possibility of for having more than two versions of every character through multiple sign bits, which will be investigated in future work as well.

We now present our new character level dynamic tainting technique using complementary character coding. The three steps of dynamic tainting can be implemented as follows:

Initialization of taint values: In the context of dynamic tainting, we will use complement characters to represent tainted values and use standard characters to represent untainted values. The switching of a character's taint status can be done in a single instruction, as described above.

Taint propagation: Value comparison is used to compare characters during execution, thus the program continues to function normally in spite of the fact that extra information (taint status) is carried along with each character. Since a character and its taint status reside in the same piece of data, taint propagation via dataflow occurs automatically during execution. Therefore code instrumentation and its resulting overhead is no longer needed for taint propagation. This is one of the strengths of our technique over existing dynamic tainting techniques. We currently assume the applications only propogate taint via data flow. Program transformation techniques similar to those in [7] could be used in a pre-processing step to assure this, if necessary.

Instrumentation of taint sinks:

As discussed in section 3, if the component C to which a string is being sent is complement aware, checking of whether tainted data is being used appropriately is delegated to C, so no additional instrumentation is needed at the taint sink.

If C is a legacy component that is not complement aware, taint sink processing similar to that of existing dynamic tainting techniques can be used, after isolating the sign bit of each character to check its taint status. This can be done through code instrumentation or by passing the data through a filter before passing it to C.

Complementary character coding has the following advantages over existing dynamic tainting techniques: First it allows for free taint storage and implicit taint propagation through normal execution, removing the need for code instrumentation and the resulting overhead of existing dynamic tainting techniques. Second, under the guise of a character encoding, our technique allows for complete and seamless taint propagation between different server-side components, and also between servers and clients over HTTP.

Our approach is particularly useful against persistent cross site scripting attacks, as taint status of every character is automatically stored in the database, along with the character. Data read in from the database carries detailed information about taint status. Thus, when such data becomes the web application output, it can be handled appropriately (either through complement aware browser techniques or through server-side filtering.) Achieving this type of protection efficiently with existing dynamic tainting techniques remains a challenge, as it would require taint information to be passed to and from the DBMS, along with data being inserted or retrieved.

3. Complement Aware Components

We now describe how a component can leverage complementary character coding to allow safe execution against injection attacks. A web application constructs statements of a component language by mixing trusted strings provided by the developers and untrusted user input data and sends these to other components. We assume here that developer code is trusted.

Each component C takes inputs in a formal language $L_C$ with a well-defined lexical and grammatical structure (SQL, HTML, etc.). As in reference [30] each component language can have a security policy that stipulates where untrusted user inputs are permitted within elements of $L_C$. In general, a security policy could be expressed at the level of $L_C$'s context free grammar, but our technique focuses on security policies defined at the level of $L_C$'s lexical structure.

In our approach, complementary character coding is used to distinguish trusted (developer-generated) characters from untrusted (user-generated) characters throughout the system. Trusted characters are represented by standard characters while untrusted characters are represented by complement characters. By making small modifications to their parsers, components can be made complement aware, capable of safe execution against input injection attacks through the enforcement of a default security policy, or other optional policies if the default policy is deemed too restrictive.

More formally, the security policy of a complement aware component C is defined in terms of the tokens of $L_C$. The allowed tokens are tokens which can include untrusted characters; all other tokens are designated as sensitive tokens where untrusted characters are not allowed. We define a Default Policy for each component language as follows: All tokens except literal strings (not including the string delimiters) and numbers are sensitive. The Default Policy defines the allowed token set as numbers and literal strings, all other tokens are defined as sensitive tokens. For example, the Default Policy applied to SQL states that tokens representing numbers and literal strings are allowed tokens, while all other tokens representing SQL keywords, operators, attribute names, delimiters, etc. are sensitive tokens.

A component C with input language $L_C$ is complement aware with respect to a security policy P with allowed token set $A_P$ if The character set includes all relevant standard and complement characters (e.g. complementary ASCII or complementary Unicode).

Sensitive tokens, i.e., tokens that are not in $A_P$, only contain standard characters.

$L_C$ has a default token d which is in $A_P$. Strings that do not match any other token match d. (Typically this would be the string literal token).

During lexical analysis C uses value comparison while attempting to recognize tokens in $A_P$ and uses full comparison for all other tokens.

Aside from parsing, C uses value comparison (e.g. during execution).

The first four elements assure that complement aware components enforce their security policies and the last element allow the component to function normally after checking the security policy, so data values are compared as usual, preserving normal functionality.

Assume trusted developer code is encoded in standard characters and user inputs are translated into complement characters on entry to the system (e.g. by the web server). Consider what happens when the application sends a string s to component C. Since a substring of s that contains complement characters cannot match any sensitive token under full comparison, the following Safety Property is satisfied:

If component C is complement aware with respect to security policy P then C enforces P, i.e., for any string s, consisting of trusted (standard) and untrusted (complement) characters that is input to C, parsing s with $L_C$'s grammar yields a parse tree in which every token (terminal symbol) that contains untrusted characters is in $A_P$.

Consequently, when the parsed token stream is further interpreted (e.g. during execution of the input), no sensitive tokens will come from untrusted inputs. Note that if C is complement aware with respect to the Default Policy and if s is an attempted injection attack in which characters that come from user are encoded with complement characters, then C's lexical analyzer will treat any keywords, operators, delimiters, etc. in s that contain complement characters (i.e. that were entered by the user) as parts of the default token (string literal), and the attack string will be safely executed like normal inputs.

The Default Policy is a strong policy that is restrictive. It is designed to be a safe default that is applicable to a wide number of languages against both malicious and nonmalicious types of injections. For example, the Default Policy would define the use of HTML boldface tags (<b>and </b>) from user inputs as a form of HTML injection, thus they are blocked by our technique while enforcing the Default Policy. Other less restrictive policies can be defined through the addition of more tokens to the allowed token set $A_P$. For example, if the developers of a web browser wish to allow the rendering of boldface tags entered by users, they can modify the Default Policy by adding boldface tags to $A_P$, creating a less restrictive policy which allows the rendering of boldface tags when enforced using the same technique above.

To implement a complement aware version of a component C, its lexical analyzer can be modified in a conceptually straight-forward manner. Let $r_t$ be the regular expression describing a token t. If t is in $A_P$ (an allowed token), $r_t$ is modified by replacing each character s by the expression (s/s') where s' is the complement character corresponding to s and the vertical bar is the OR symbol of the regular expression language. For example, to allow a boldface tag, the regular expression <b>, would be replaced by (</<)(b/b')(>/>'), which represents the tag written with standard or complement characters. The lexical analyzer can then be modified, accordingly.

Figure 3:
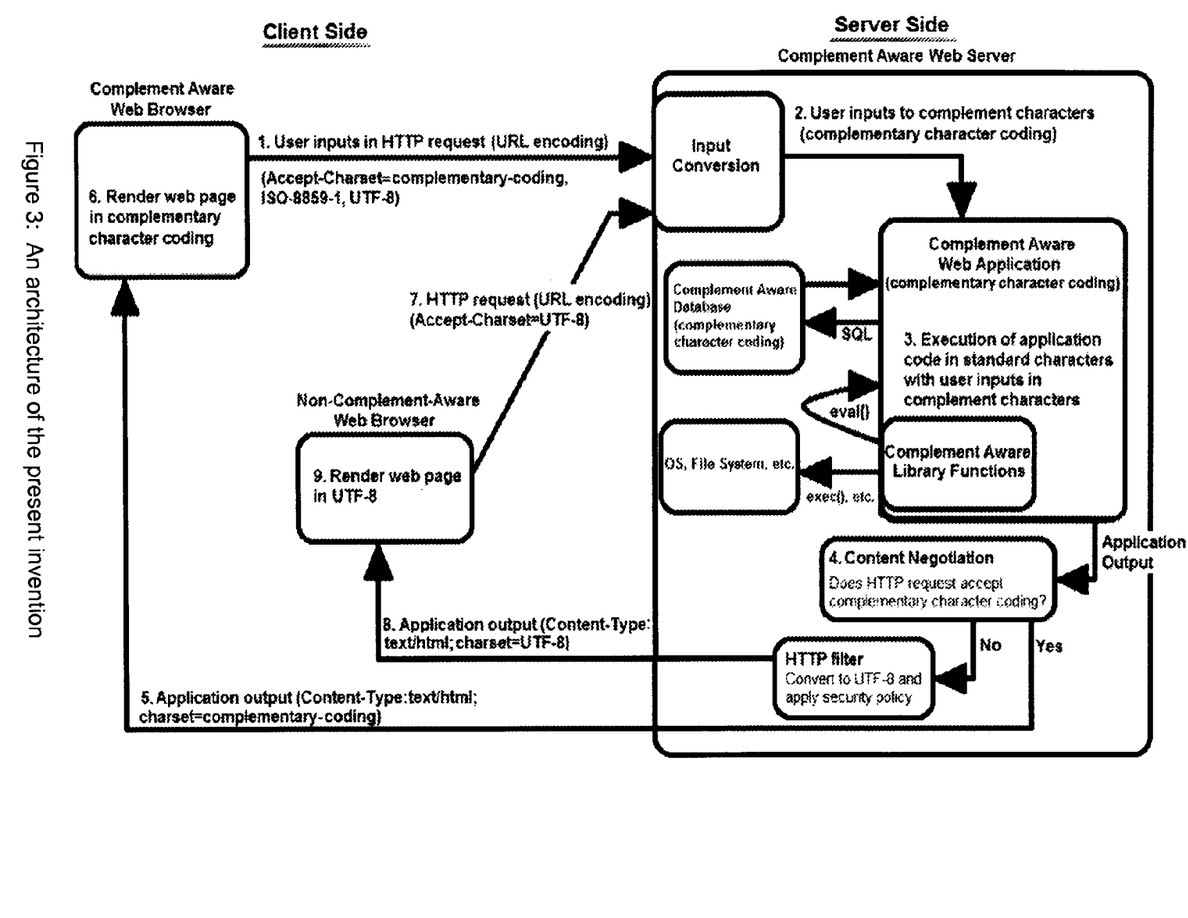
FIG. 3 is an architecture of the present invention.

FIG. 3 provides an architectural overview of our technique. We can ensure backwards compatibility between complement aware servers and legacy web browsers with the use of HTTP content negotiation [37] with the Accept-Charset header. A content negotiation module, shown in step 4 of FIG. 3, routes the application output in two ways. For a complement aware browser which specifies itself as complement aware in the Accept-Charset header, the content negotiation module sends the application output in complementary character coding over HTTP unchanged. For a legacy web browser that does not support complementary character coding, the negotiation module routes the output to an HTTP filter. The filter performs the function of a complement aware web browser on the server side at the expense of server side overhead. It does so by applying the Default Policy for HTML and converting its character encoding to one that is readable by the client web browser, specified by the Accept-Charset header in the request. This modified output is then sent back to the client web browser.

This architecture allows for a gradual migration strategy. Initially, deployment of complement aware servers would result in the usage of the HTTP filter for nearly all requests, resulting in extra server overhead. This extra server overhead would gradually decrease as more and more users upgrade to complement aware web browsers, which no longer use the filtering.

We now present two illustrations of our technique with FIG. 3. Scenario (1) uses a complement aware web browser. Scenario (2) uses a legacy web browser that does not support complementary character coding to demonstrate our content negotiation mechanism for backwards compatibility. For both scenarios, we assume the complement aware components implement the Default Policy as their security policies.

Scenario 1: In step 1, a HTTP request along with standard URL encoded user inputs are sent to the server by a complement aware web browser. The request is URL encoded as specified by the HTTP protocol, identifying itself as complement aware with the Accept-Charset header. In step 2, the server converts the user input into complementary ASCII/Unicode as complement characters3. In step 3, these converted inputs are executed in the web application, where developer code are in standard characters while user inputs are in complement characters. Value comparison is used within the application, so it functions normally. When the application sends strings to complement aware components, the components apply their security policies. For example, as SQL statements are constructed and sent to a complement aware database component to be parsed, the default security policy is enforced by using full comparison to match all SQL tokens in the sensitive token set (every token except numbers and literal strings), while using value comparison to match tokens in the allowed token set (numbers and literal strings). After parsing, during the execution of the SQL query by the database component, value comparison is used, so functionality is preserved.

The application constructs the HTML output by mixing developer code, user inputs, and values obtained from the database. In step 4, this output is sent to the content negotiation module, which checks the Accept-Charset header of the HTTP request to see if the client browser is complement aware. Since the browser is complement aware in scenario (1), the application output is sent back to the client browser as the HTTP response, labeling the output character set as complementary ASCII/Unicode. In step 5, the complement aware browser receives the HTML output, recognizes the output character set as complementary ASCII/Unicode and parses the output accordingly. During parsing the browser's security policy is enforced. Because the Default Policy is used, full comparison is used to match all HTML tags, comments, etc. Consequently, any such tokens that are tainted, whether they came directly from this user's input or whether they'd been stored previously then retrieved from the database, are treated as default tokens, i.e. string literals. After parsing, the page is then rendered on the screen where value comparison is used in principle; this means that complement characters are made to look like their default counterparts on the screen.

Scenario 2: The browser does not support complementary character coding. Beginning at step 7, the browser sends an URL encoded HTTP request to the server, similar to step 1. However, the request does not identify itself as complement aware at the Accept-Charset header; it accepts UTF-8 instead. The input conversion in step 2 and execution of application code in step 3 are the same as in scenario (1). In step 4, the application output is sent to the content negotiation module, which checks the Accept-Charset header of the HTTP request to see if the client web browser is complement aware. Since the web browser in this scenario is not complement aware, the output is sent to an HTTP filter, which applies the Default Policy for HTML, while converting its character encoding to UTF-8. For example, the filter can escape tainted characters occurring in HTML tags using HTML numeric character references [36]. This is similar to the processing that needs to be done at sinks in existing dynamic tainting approaches, but since the taint marks were preserved as the data passed in and out of the database, it offers protection against stored XSS attacks. Finally, the new output is sent to the browser in step 8 and rendered normally in step 9.

4. Example Revisited With CAC

Now we will demonstrate how the four example cases from Section 1.1 will execute as complement aware components enforcing the Default Policy with complementary ASCII. Assume we are using a complement aware web browser. First, according to steps 1 and 2 on FIG. 3, all user inputs are converted into complement characters by the server upon arrival. Developer code is encoded in standard characters. We now describe each case as we begin step 3 on FIG. 3, as the application begins to execute. We will show all complement characters with underlines.

In case one, first the application generates Welcome user as HTML at lines 16 to 18. At line 24, the application constructs the SQL query insert into messages values ('user', 'hello') and sends it to the DBMS to be executed. During parsing of the SQL query, the complement aware DBMS enforces the Default Policy by using full comparison to match all sensitive tokens in SQL. The tokens user and hello are recognized as literal strings (albeit with a non-standard character set). During the execution of the SQL query value comparison is used if the query involves some form of comparison. (It is not shown in this example however, but if the query contains a where clause then value comparison would be used to evaluate it.) The values user and hello are stored in the database. When lines 27 to 34 are executed, the application generates HTML to display the contents of the database. A SQL query is generated at line 27 and the query is passed to the DBMS at line 28. This query is encoded entirely in standard characters; each string representing a token matches the intended token using full comparison, so the query is executed. The contents of the database are encoded in complementary ASCII which contains a mixture of standard characters and complement characters. The comparison at line 31 uses value comparison, which works correctly. (The value user is not equal to admin, but admin, admin, admin, admin, etc. are all equivalent to each other under value comparison.) (Similarly, if the comparison had been done using a WHERE clause in the query, rather than by the PHP code, the DBMS would have used value comparison while evaluating the WHERE clause of the query, with the same results.)

The content negotiation module in step 4 recognizes the browser as complement aware and, in step 5, sends the generated HTML unchanged to the web browser. In step 6, the web browser parses the HTML. To enforce the Default Policy, full comparison is used during parsing to match any HTML tags, comments, etc. Since user and hello are in complement characters while HTML tags are in standard characters, they cannot be matched as any tag under full comparison during parsing and the Default Policy is enforced. After parsing, the characters are then rendered by the web browser, at this point value comparison is used in principle. It basically means that the complement characters are made to look the same as their standard counterparts on the user's screen.

In case two, the SQL query insert into messages values ('user', 'hello');drop table messages;--') is constructed and sent to the database parser at line 24. Full comparison is used during parsing. The values user and hello');drop table messages;--match no sensitive tokens in SQL because under full comparison, _'is not equal to ', is not equal to), drop is not equal to drop, etc. Therefore the input strings are recognized as default tokens (in this case string literals) and are stored literally in the database just like any other string the user provides. The maliciously injected SQL tokens are not interpreted by the DBMS parser the way the attacker intended, so the attempted SQL injection attack fails while the application continues to execute correctly.

In case three, value Welcome <script>document.location="http://poly.edu"</script>is generated as HTML at lines 16 to 18. When the page is parsed by the web browser, the HTML parser uses full comparison. No tags are matched by the parser because <script>is not equal to <script>under full comparison. So the browser does not interpret the injected tag as the beginning of a script and does not send the contents to the Javascript interpreter. Instead, this string and every other string the user enters will just be rendered literally on the screen.

Case four is the same as case three except that the attack string is stored in the database as well. Like before, the input does not match any tokens in SQL or any HTML tags under full comparison during parsing. The string is stored literally in the database and is displayed literally on the web browser.

This example only shows the prevention of SQL injection and cross-site scripting; however, it is important to note that our technique is designed to be general and it can be used against other types of web application injections as well.

With complementary character coding, wherever user input is being used to construct statements in a language that is interpreted by other components (XML interpreters, eval, etc), security policies for those components can be defined and complement aware versions of the component can be implemented to prevent injection attacks.

5. Implementation

We now describe our proof of concept implementation of LAMP (Linux Apache MySQL PHP) with complementary ASCII. Our implementation enforces the Default Policy for all components. It is incomplete, as we have only implemented enough to perform our experiments. The key implementation issue is implementing value comparison at the right places, since full comparison is already done by default. To simplify our implementation we have omitted the encoding of numbers into complement characters, as the Default Policy already omits numbers. Because of this no modifications of parsers are necessary to enforce the Default Policy.

We begin with an installation of LAMP with an 8 bit character encoding. For simplicity, we used the Latin-1 character set [14]. Latin-1's first 128 characters are exactly the same as the standard characters in complementary ASCII. We will use the other 128 characters to represent complement characters even though they look different, since we can easily modify the way they are displayed in several ways. We choose the simplest approach of modifying a font in Linux to display them correctly, this allows us to skip the implementation of value comparison in a web browser to support the rendering of complement characters correctly. We modified PHP to encode the contents of GET and POST input arrays into complement characters at the point they are initialized. We modified the PHP interpreter so that the bytecode instructions for comparison used value comparison. The parser continues to use full comparison. For MySQL, the query execution engine was modified to use value comparison, while the parser continued to use full comparison. The content negotiation module and HTTP filter are implemented with an Apache output filter. Since we are using the Default Policy, the filter simply converts all complement characters to a safe representation by encoding them using HTML numeric character references.

This implementation was sufficient for experimenting with a variety of web applications. There is more work to be done for a complete implementation, including encoding of other forms of user input such as cookies into complement characters, modification of the MySQL parser to use value comparison to match numbers, modification of a web browser to use value comparison to display characters, the implementation of a complement aware Javascript engine in this web browser, and a more complex content negotiation filter to support Javascript on the server side. Additional support for other features and library functions in PHP and MySQL to support value comparison is also needed. As discussed in section 5, every library function and feature involving low level bit manipulation would be examined and changed to support complementary character coding, e.g. string to number functions, arithmetic functions, hash functions, etc.

In addition, implementation of more flexible (non-default) security policies and extend the prototype may cover additional components, such as the shell interpreter (to guard against operating system command injections.)

6. Evaluation

Our experimental evaluation has two objectives: 1) evaluate our implementation's effectiveness against attacks, and 2) measure the runtime overhead resulting from using our implementation. Two sets of test data were used. The SQL Injection Application Testbed [29] was created to evaluate a technique called AMNESIA [10] which guards against SQL injection. This testbed has also been used for evaluating various techniques developed by other researchers [3, 11, 28, 30]. It consists of a large number of test cases on a series of applications available at http://gotocode.com. It contains two types of test cases: the ATTACK set which contains SQL injection attacks, and the LEGIT set which contains legitimate queries that look like SQL injection attacks.

Our second benchmark is from ARDILLA [17], which generates test cases automatically. This test set contains cases of SQL injections, and both reflected and persistent cross site scripting attacks on a set of applications found on http://sourceforge.net/. Tables 2 and 3 summarize both of these benchmarks. The first columns contain the names of the applications. The second columns contain the number of lines of code (LOC) from each application. The remaining columns show the numbers of the different types of test cases from each set. All the programs are LAMP applications. Our experiments are performed on a dual core 2 GHz laptop with 3 GB of RAM running our LAMP implementation based on Ubuntu 9.04, Apache 2.2.13, MySQL 5.1.39, and PHP 5.2.11. Two minor incompatibilities were encountered during the installation of these applications. They were caused by the lack of implementation of value comparison in certain language features of PHP and MySQL. The first one is caused by the lack of value comparison in the MD5 function from PHP, as a temporary workaround we remove calls to this function. The second incompatibility is due to the lack of support of the ENUM data type in MySQL, we have replaced ENUM with VARCHAR in database schemas as a workaround. Both of these issues can be resolved with a complete implementation of our system.

TABLE 2

Description of the SQL Injection Application Testbed

| | LOC | Cartesian (ATTACK set) | perParam (ATTACK set) | Random (ATTACK set) | Legit (LEGIT set) | Total |
|---|---|---|---|---|---|---|
| bookstore | 16,959 | 3063 | 410 | 2001 | 608 | 6082 |
| classifieds | 10,949 | 3211 | 378 | 2001 | 576 | 6166 |
| empldir | 5,658 | 3947 | 440 | 2001 | 660 | 7048 |
| events | 7,242 | 3002 | 603 | 2001 | 900 | 6506 |
| portal | 16,453 | 2968 | 717 | 2001 | 1080 | 6766 |

TABLE 3

Description of ARDILLA Test Set

| | LOC | SQL Injection | Reflected XSS | Persistent XSS | Total |
|---|---|---|---|---|---|
| schoolmate | 8,181 | 6 | 10 | 2 | 18 |
| webchess | 4,722 | 12 | 13 | 0 | 25 |
| faqforge | 1,712 | 1 | 4 | 0 | 5 |
| geccbblite | 326 | 2 | 0 | 4 | 6 |

To evaluate effectiveness of our technique, we ran both test sets with our CAC implementation. We then examined the database query logs, the database tables, and the HTML output to determine if an attack has actually occurred. Examination of the database query logs shows that the same set of SQL queries were executed over and over again for the same page, and that all user inputs in the queries and the database were encoded as complement characters. Upon further examination of the HTML outputs we conclude that the applications display the same default behavior (invalid password, no results found, etc.) whether they are under attack or not. As expected, there were no signs of injections. We also manually tested each application for functionality defects, and we found no defects caused by our technique other than the two installation issues discussed above. We then measured the runtime overhead of our technique. We expected the overhead of our technique to be small, since the only sources of overhead are from the encoding of user inputs into complement characters and the use of value comparison, each of which was implemented in a few instructions.

Our evaluation is done by comparing the difference in runtime between the original LAMP installation that our implementation is based on, and our CAC implementation both with and without the use of the HTTP filter to measure the overhead of our content negotiation technique. We only use the LEGIT set from the SQL Injection Application Testbed for this, since successful attacks from the ATTACK set on the original installation would cause different paths of execution, and produce irrelevant timing results. We ran this test set on each setup 100 times and computed the average run time and the 95% confidence interval. The results were shown on table 4. The first column contains the names of the applications. The second column contains the average time of the original LAMP installation over 100 runs along with its 95% confidence interval. The third column contains the average time of our complement aware server implementation without passing through the HTTP filter (interacting with a complement aware web browser). The fourth column contains the percentage difference between columns two and three. The fifth column contains the average time of our complement aware server through the HTTP filter (interacting with a legacy web browser) to show the overhead of our backwards compatibility technique.

TABLE 4

Result of Timing Evaluation

| | Default LAMP (seconds) | CAC without filter (seconds) | Percentage Overhead | CAC with filter (seconds) | Percentage Overhead (filtered) |
|---|---|---|---|---|---|
| bookstore | 6.816185 ± 0.054733 | 6.866490 ± 0.057927 | 0.007380 (0.7380%) | 6.934719 ± 0.061145 | 0.017390 (1.7390%) |
| classifieds | 6.851533 ± 0.056738 | 6.873226 ± 0.094567 | 0.003166 (0.3166%) | 6.914917 ± 0.068607 | 0.009251 (0.9251%) |
| empldir | 10.166116 ± 0.074745 | 10.148491 ± 0.065809 | −0.001734 (−0.1734%) | 10.182922 ± 0.00734 | 0.001653 (0.1653%) |
| events | 17.744610 ± 0.185874 | 17.723213 ± 0.181301 | −0.001206 (−0.1206%) | 17.760221 ± 0.183376 | 0.000880 (0.0880%) |
| portal | 45.581225 ± 0.201577 | 45.905163 ± 0.195552 | 0.007107 (0.7107%) | 45.793739 ± 0.227628 | 0.004662 (0.4662%) |

These results shows a performance improvement of complementary character coding compared to existing dynamic tainting techniques. For example, the average overhead of WASP [11] over the same benchmark is listed as 6%, while the worst case overhead of our technique is no more than 2%. Since overhead were on the order of milliseconds per request, other factors such as database operations, network delay, etc. will easily dominate it when our technique is deployed for real world applications.

7. Conclusion

In this Specification, we have presented complementary character coding and complement aware components, a new approach to dynamic tainting for guarding against a wide variety of web application injection attacks. In our approach, two encodings are used for each character, standard characters and complement characters. Untrusted data coming from users is encoded with complement characters, while trusted developer code is encoded with standard characters. Complementary character coding allows additional information about each character (whether it comes from a trusted or untrusted source) to be propagated across component boundaries seamlessly. Components are modified to enforce security policies, which are characterized by sets of allowed tokens, for which user input characters should not be permitted. Each complement aware component enforces its policy by using full comparison to match sensitive tokens during parsing. Elsewhere they use value comparison to preserve functionality. This allows them to safely execute attempted injection attacks as normal inputs. While ideally, the technique would be used with complement aware components on both the server side and the client side, it is backward compatible with existing browsers through HTTP content negotiation and server-side filtering. Whether deployed with complement aware browser or with a legacy browser, it provides protection against stored XSS attacks. We have implemented a prototype for LAMP and conducted an experimental evaluation. The prototype prevented all SQL injection, reflected and stored cross-site scripting injection attacks in the benchmarks studied.

Other embodiments include extending the prototype to handle Unicode and more flexible security policies, incorporating techniques to deal with taint propagation via control flow, more thorough evaluation of effectiveness and overhead, and exploring other applications of complementary character coding and its extended version through the use of multiple sign bits.

This detailed description of the preferred embodiments and the appended figures have been presented only for illustrative and descriptive purposes, are not intended to be exhaustive and are not intended to limit the scope and spirit of the invention. The embodiments were selected and described to best explain the principles of the invention and its practical applications, and one skilled in the art will recognize that many variations can be made to the invention disclosed herein without departing from the scope and spirit of the invention.

REFERENCES

[1] American Standard Code for Information Interchange. http://en.wikipedia.org/wiki/ASCII.

[2] Davide Balzarotti, Marco Cova, Vika Felmetsger, Nenad Jovanovic, Engin Kirda, Christopher Kruegel, and Giovanni Vigna. Saner: Composing static and dynamic analysis to validate sanitization in web applications. In SP '08: Proceedings of the 2008 IEEE Symposium on Security and Privacy, pages 387-401, Washington, D.C., USA, 2008. IEEE Computer Society.

[3] Sruthi Bandhakavi, Prithvi Bisht, P. Madhusudan, and V. N. Venkatakrishnan. Candid: preventing sql injection attacks using dynamic candidate evaluations. In CCS '07: Proceedings of the 14th ACM Conference on Computer and Communications Security, pages 12-24, New York, N.Y., USA, 2007. ACM.

[4] Prithvi Bisht and V. N. Venkatakrishnan. Xss-guard: Precise dynamic prevention of cross-site scripting attacks. In DIMVA '08: Proceedings of the 5th international conference on Detection of Intrusions and Malware, and Vulnerability Assessment, pages 23-43, Berlin, Heidelberg, 2008. Springer-Verlag.

[5] Stephen W. Boyd and Angelos D. Keromytis. Sqlrand: Preventing sql injection attacks. In Proceedings of the 2nd Applied Cryptography and Network Security (ACNS) Conference, pages 292-302, 2004.

[6] Gregory Buehrer, Bruce W. Weide, and Paolo A. G. Sivilotti. Using parse tree validation to prevent sql injection attacks. In SEM '05: Proceedings of the 5th International Workshop on Software Engineering and Middleware, pages 106-113, New York, N.Y., USA, 2005. ACM.

[7] J. Clause, W. Li, and A. Orso. Dytan: A generic dynamic taint analysis framework. In ISSTA '07: Proceedings of the 2007 International Symposium on Software Testing and Analysis, pages 196-206, New York, N.Y., USA, 2007. ACM.

[8] Matthew Van Gundy and Hao Chen. Noncespaces: Using randomization to enforce information flow tracking and thwart cross-site scripting attacks. In NDSS 2009.

[9] Vivek Haldar, Deepak Chandra, and Michael Franz. Dynamic taint propagation for java. In ACSAC '05: Proceedings of the 21st Annual Computer Security Applications Conference, pages 303-311, Washington, D.C., USA, 2005. IEEE Computer Society.

[10] William G. J. Halfond and Alessandro Orso. Amnesia: analysis and monitoring for neutralizing sql-injection attacks. In ASE '05: Proceedings of the 20th IEEE/ACM International Conference on Automated Software Engineering, pages 174-183, New York, N.Y., USA, 2005. ACM.

[11] William G. J. Halfond, Alessandro Orso, and Panagiotis Manolios. Using positive tainting and syntax-aware evaluation to counter sql injection attacks. In SIGSOFT '06/FSE-14: Proceedings of the 14th ACM SIGSOFT International Symposium on Foundations of Software Engineering, pages 175-185, New York, N.Y., USA, 2006. ACM.

[12] Yao-Wen Huang, Shih-Kun Huang, Tsung-Po Lin, and Chung-Hung Tsai. Web application security assessment by fault injection and behavior monitoring. In WWW '03: Proceedings of the 12th International Conference on World Wide Web, pages 148-159, New York, N.Y., USA, 2003. ACM.

[13] Yao-Wen Huang, Fang Yu, Christian Hang, Chung-Hung Tsai, Der-Tsai Lee, and Sy-Yen Kuo. Securing web application code by static analysis and runtime protection. In WWW '04: Proceedings of the 13th International Conference on World Wide Web, pages 40-52, New York, N.Y., USA, 2004. ACM.

[14] ISO/IEC 8859-1. http://en.wikipedia.org/wiki/ISO/IEC 8859-1.

[15] Trevor Jim, Nikhil Swamy, and Michael Hicks. Defeating script injection attacks with browser-enforced embedded policies. In WWW '07: Proceedings of the 16th International Conference on World Wide Web, pages 601-610, New York, N.Y., USA, 2007. ACM.

[16] Nenad Jovanovic, Christopher Kruegel, and Engin Kirda. Pixy: A static analysis tool for detecting web application vulnerabilities (short paper). In SP '06: Proceedings of the 2006 IEEE Symposium on Security and Privacy, pages 258-263, Washington, D.C., USA, 2006. IEEE Computer Society.

[17] Adam Kieyzun, Philip J. Guo, Karthick Jayaraman, and Michael D. Ernst. Automatic creation of sql injection and cross-site scripting attacks. In ICSE '09: Proceedings of the 2009 IEEE 31st International Conference on Software Engineering, pages 199-209, Washington, D.C., USA, 2009. IEEE Computer Society.

[18] Engin Kirda, Christopher Kruegel, Giovanni Vigna, and Nenad Jovanovic. Noxes: a client-side solution for mitigating cross-site scripting attacks. In SAC '06: Proceedings of the 2006 ACM Symposium on Applied Computing, pages 330-337, New York, N.Y., USA, 2006. ACM.

[19] V. Benjamin Livshits and Monica S. Lam. Finding security vulnerabilities in java applications with static analysis. In SSYM'05: Proceedings of the 14th Conference on USENIX Security Symposium, pages 18-18, Berkeley, Calif., USA, 2005. USENIX Association.

[20] Mike Ter Louw and V. N. Venkatakrishnan. Blueprint: Robust prevention of cross-site scripting attacks for existing browsers. In SP '09: Proceedings of the 2009 30th IEEE Symposium on Security and Privacy, pages 331-346, Washington, D.C., USA, 2009. IEEE Computer Society.

[21] Michael Martin, Benjamin Livshits, and Monica S. Lam. Finding application errors and security flaws using pql: a program query language. SIGPLAN Not., 40(10):365-383, 2005.

[22] Yacin Nadji, Prateek Saxena, and Dawn Song. Document structure integrity: A robust basis for cross-site scripting defense. In NDSS [1].

[23] Florian Nentwich, Nenad Jovanovic, Engin Kirda, Christopher Kruegel, and Giovanni Vigna. Cross-site scripting prevention with dynamic data tainting and static analysis. In In Proceeding of the Network and Distributed System Security Symposium NDSS07, 2007.

[24] Anh Nguyen-Tuong, Salvatore Guarnieri, Doug Greene, Jeff Shirley, and David Evans. Automatically hardening web applications using precise tainting. In Ryoichi Sasaki, Sihan Qing, Eiji Okamoto, and Hiroshi Yoshiura, editors, SEC, pages 295-308. Springer, 2005.

[25] OWASP Top Ten Project. http://www.owasp.org/index.php/Category:OWASP Top Ten Project.

[26] Perl security: Taint mode. http://perldoc.perl.org/perlsec.html#Taint-mode.

[27] Tadeusz Pietraszek, Chris Vanden Berghe, Chris V, and En Berghe. Defending against injection attacks through context-sensitive string evaluation. In In Recent Advances in Intrusion Detection (RAID), 2005.

[28] R. Sekar. An efficient black-box technique for defeating web application attacks. In NDSS [1].

[29] SQL Injection Application Testbed. http://www.cc.gatech.edu/whalfond/testbed.html.

[30] Z. Su and G. Wassermann. The essence of command injection attacks in web applications. In POPL '06: Conference record of the $33^{rd}$ ACM SIGPLAN-SIGACT Symposium on Principles of Programming Languages, pages 372-382, New York, N.Y., USA, 2006. ACM.

[31] Omer Tripp, Marco Pistoia, Stephen J. Fink, Manu Sridharan, and Omri Weisman. Taj: Effective taint analysis of web applications. In PLDI '09: Proceedings of the 2009 ACM SIGPLAN Conference on Programming Language Design and Implementation, pages 87-97, New York, N.Y., USA, 2009. ACM. [32] Unicode Consortium. http://Unicode.org/.

[33] Fredrik Valeur, Darren Mutz, and Giovanni Vigna. A learning-based approach to the detection of sql attacks. In In DIMVA (2005), pages 123-140, 2005.

[34] Gary Wassermann and Zhendong Su. Sound and precise analysis of web applications for injection vulnerabilities. In PLDI '07: Proceedings of the 2007 ACM SIGPLAN Conference on Programming Language Design and Implementation, pages 32-41, New York, N.Y., USA, 2007. ACM.

[35] Gary Wassermann and Zhendong Su. Static detection of cross-site scripting vulnerabilities. In ICSE '08: Proceedings of the 30th international conference on Software engineering, pages 171-180, New York, NY, USA, 2008. ACM.

[36] World Wide Web Consortium. HTML Specification Section 5.3.1. http://www.w3.org/TR/html4/charset.html.

[37] World Wide Web Consortium. RFC 2616 Section 12: Content Negotiation. http://www.w3.org/Protocols/rfc2616/rfc2616-sec12.html.

[38] Wei Xu, Sandeep Bhatkar, and R. Sekar. Taint-enhanced policy enforcement: a practical approach to defeat a wide range of attacks. In USENIXSS'06: Proceedings of the 15th Conference on USENIX Security Symposium, Berkeley, Calif., USA, 2006. USENIX Association.

What is claimed is:

1. A method performed by at least one computer processor for marking taint status of data that is input to a computer system, the method comprising the steps of:
   a) receiving, by a first computer processor residing on a first device, untrusted data from a user, wherein untrusted data is defined as any data that is input by said user;
   b) receiving, by said first computer processor, trusted data of an executable statement from a trusted source, wherein trusted data is defined as component language code or developer code that is developer generated;
   c) encoding, by said first computer processor, said untrusted data into complement characters by complimenting each character individually in the executable statement;
   d) encoding, by said first computer processor, said trusted data of an executable statement into standard characters;
   e) interleaving, by said first computer processor, the encoded untrusted data into the encoded trusted data of an executable statement to produce an executable statement, the first computer processor using value comparison of the data during execution, wherein value comparison compares all of the bits of a character not including the sign bit;
   f) specifying security policies for a second computer processor residing on a second device, by designating tokens in the language of the second computer processor to be either a sensitive token or an allowed token, wherein an allowed token is a token deemed trusted and a sensitive token is a token deemed untrusted; and
   g) parsing, by the second computer processor, the trusted data of the executable statement,
   wherein the data comprises characters and each of the characters has multiple encodings representing the trusted data and the untrusted data, and the characters from the untrusted data are forbidden in the sensitive tokens,
   wherein the parsing is performed using full comparison for matching sensitive tokens contained in said executable statement,
   wherein full comparison compares all of the bits of the character including the sign bit, and
   wherein the parsing is performed using value comparison for matching allowed tokens contained in said executable statement.

2. The method as claimed in claim 1, wherein the complement characters indicate the untrusted data and the standard characters indicate the trusted data.

3. A method performed by at least one computer processor for preventing injection attacks in executable computer code in a web application in which the web application constructs statements of a component language by mixing trusted characters provided by a first source and untrusted characters provided by a second source, wherein the trusted characters are defined as component language code or developer code that is developer generated and wherein the untrusted characters are defined as any data that is input by said user, comprising the steps of:
   a) encoding, a first computer processor residing on a first device, each of the characters with two code points, resulting in standard characters and complement characters of the standard characters, wherein said untrusted characters are encoded into complement characters by complimenting each character individually in the executable statement;
   b) using the standard characters to represent the trusted characters and using the complement characters to represent the untrusted characters;
   c) interleaving the trusted standard characters with the untrusted complement characters to create the executable computer code, and comparing the characters using value comparison, wherein value comparison compares all of the bits of a character not including the sign bit, whereby taint propagation of the untrusted characters via dataflow occurs automatically;
   d) designating, on a second computer processor residing on a second device, tokens to be either a sensitive token or an allowed token, wherein an allowed token is a token deemed trusted and a sensitive token is a token deemed untrusted; and
   e) comparing the characters using full comparison to match sensitive elements during parsing of the characters, and comparing the characters using value comparison to match allowed tokens, wherein full comparison compares all of the bits of the character including the sign bit, wherein each of the characters has multiple encodings representing the trusted characters and the untrusted characters, and the untrusted characters are forbidden in the sensitive tokens.

4. The method as claimed in claim 3, wherein the complement characters indicate the untrusted data and the standard characters indicate the trusted data.

5. The method as claimed in claim 4, wherein the trusted characters are contained in code on the web application and are encoded in the standard characters, and the untrusted characters are encoded in the complement characters.

6. The method as claimed in claim 5, wherein the value comparison is used to compare the characters during execution of the executable computer code, whereby the executable computer code continues to function normally as the value comparison is used and the taint status of each of the characters is carried along with each of the characters.

7. The method as claimed in claim 6, wherein the taint status of the characters is not considered during the value comparison.

8. The method as claimed in claim 6, wherein the taint status of the characters is stored along with the characters.

9. The method as claimed in claim 3, wherein each of the characters of the data comprises at least two bit representations.

10. The method as claimed in claim 9, wherein at least one bit of the representation is a data bit and wherein at least one bit of the representation is not a data bit, and wherein the data bits of the standard and complement versions of each character are the same, and wherein at least one bit of each of the standard characters differs from the corresponding bit of its complement version.

11. The method as claimed in claim 10, wherein the full comparison compares each bit of the characters whereby the standard and the complement version of a character are considered not equivalent, and wherein the value comparison compares only the data bits of the characters whereby the standard and the complement versions of a character are considered equivalent.

12. The method as claimed in claim 10, wherein the bit(s) other than the data bits of the characters are isolated to check the taint status of the characters.

13. A method for enforcing security policies for executable computer code in a web application in which the web application constructs statements of a component language by mixing characters provided by a first source and characters provided by a second source, comprising the steps of:
   a) on a first computer processor residing on a first device, encoding each of the characters with two code points, resulting in a standard character and a complement character of the standard character, wherein said standard character is encoded into the complement character by complimenting each standard character individually in the executable statement, and wherein the complement characters indicate the untrusted data and the standard characters indicate the trusted data;
   b) using the standard characters to represent trusted characters and using the complement characters to represent untrusted characters, wherein the trusted characters are defined as component language code or developer code that is developer generated and wherein the untrusted characters are defined as any data that is input by said user;
   c) interleaving the encoded characters from the first source with the encoded characters from the second source to create the executable computer code for execution on a second computer processor residing on a second device, and comparing the characters using value comparison, wherein value comparison compares all of the bits of a character not including the sign bit;
   d) specifying security policies for the second computer processor by designating tokens in the language of the second computer processor to be either a sensitive token or an allowed token, wherein an allowed token is a token deemed trusted and a sensitive token is a token deemed untrusted; and
   e) using the second computer processor to parse the executable computer code created by matching the sensitive tokens using full comparison and matching the allowed tokens using value comparison, wherein full comparison compares all of the bits of the character including the sign bit.

14. The method as claimed in claim 13, wherein the trusted characters are contained in code on a web application and are encoded in the standard characters, and the untrusted characters are encoded in the complement characters.

15. The method as claimed in claim 14, wherein the value comparison is used to compare the characters during execution of the executable computer code, whereby the executable computer code continues to function normally as the value comparison is used and the taint status of each of the characters is carried along with each of the characters.

16. The method as claimed in claim 15, wherein the taint status of the characters is not considered during the value comparison.

17. The method as claimed in claim 15, wherein the taint status of the characters is stored along with the characters.

18. The method as claimed in claim 13, wherein each of the characters of the data comprises at least two bit representations.

19. The method as claimed in claim 18, wherein at least one bit of the representation is a data bit and wherein at least one bit of the representation is not a data bit, and wherein the data bits of the standard and complement versions of each character are the same, and wherein at least one bit of each of the standard characters differs from the corresponding bit of its complement version.

20. The method as claimed in claim 19, wherein the full comparison compares each bit of the characters whereby the standard and the complement version of a character are considered not equivalent, and wherein the value comparison compares only the data bits of the characters whereby the standard and the complement versions of a character are considered equivalent.

21. The method as claimed in claim 19, wherein the bit(s) other than the data bits of the characters are isolated to check the taint status of the characters.

* * * * *